(12) United States Patent
Tomozawa et al.

(10) Patent No.: US 12,473,037 B2
(45) Date of Patent: Nov. 18, 2025

(54) VEHICLE BODY UPPER STRUCTURE AND ASSEMBLY METHOD OF AUTOMOBILE VEHICLE BODY

(71) Applicant: HONDA MOTOR CO., LTD., Tokyo (JP)

(72) Inventors: Kosaku Tomozawa, Wako (JP); Yoshikatsu Ota, Wako (JP); Masaaki Fujimoto, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 339 days.

(21) Appl. No.: 18/192,131

(22) Filed: Mar. 29, 2023

(65) Prior Publication Data
US 2023/0312022 A1 Oct. 5, 2023

(30) Foreign Application Priority Data
Mar. 31, 2022 (JP) ................. 2022-058401

(51) Int. Cl.
*B62D 27/02* (2006.01)
*B23K 35/28* (2006.01)
(Continued)

(52) U.S. Cl.
CPC ........... *B62D 27/02* (2013.01); *B23K 35/286* (2013.01); *B62D 25/02* (2013.01); *B62D 25/06* (2013.01);
(Continued)

(58) Field of Classification Search
CPC ........ B62D 27/02; B62D 25/02; B62D 25/06; B62D 29/008; B62D 25/2036; B23K 35/286; B23K 2101/006
See application file for complete search history.

(56) References Cited

U.S. PATENT DOCUMENTS 7,828,357 B2 * 11/2010 Hayashi ................ B23K 11/115
296/29
8,409,725 B2 * 4/2013 Hashimura ............ B62D 25/06
428/653
(Continued)

FOREIGN PATENT DOCUMENTS

| CN | 102781766 A | 11/2012 |
| CN | 103625559 A | 3/2014 |

(Continued)

OTHER PUBLICATIONS

Chinese Office Action received in corresponding Chinese application No. 202310163082.0 dated Sep. 27, 2025 with English translation (11 pages).
(Continued)

*Primary Examiner* — Faye M Fleming
(74) *Attorney, Agent, or Firm* — Rankin, Hill & Clark LLP (57) ABSTRACT

A vehicle body upper structure includes: roof side rails provided at end portions in a vehicle width direction of a vehicle body upper portion; side outer panels covering vehicle outer side surfaces of the roof side rails; and a roof panel made of a material different from a martial of the roof side rails and provided at a center portion in the vehicle width direction of the vehicle body upper portion, and the roof panel and the paired side outer panels are fixed to one another by braze joining. Outer end portions in the vehicle width direction of the side outer panels are joined to outer end portions in the vehicle width direction of the roof side rails. Inner end portions in the vehicle width direction of the side outer panels are not joined to inner end portions in the vehicle width direction of the roof side rails.

3 Claims, 7 Drawing Sheets

(51) Int. Cl.
  *B62D 25/02* (2006.01)
  *B62D 25/06* (2006.01)
  *B62D 29/00* (2006.01)
  *B23K 101/00* (2006.01)
  *B23K 103/20* (2006.01)
  *B62D 25/20* (2006.01)

(52) U.S. Cl.
  CPC ...... *B62D 29/008* (2013.01); *B23K 2101/006* (2018.08); *B23K 2103/20* (2018.08); *B62D 25/2036* (2013.01)

(56) References Cited

U.S. PATENT DOCUMENTS

| | | |
|---|---|---|
| 2013/0300155 A1 | 11/2013 | Kurokawa |
| 2014/0054927 A1 | 2/2014 | Nakamura et al. |
| 2014/0217783 A1 | 8/2014 | Hida et al. |
| 2017/0197269 A1 | 7/2017 | Matsumoto et al. |
| 2018/0257718 A1 | 9/2018 | Kagami et al. |
| 2023/0312001 A1* | 10/2023 | Tomozawa ............. B62D 27/02 296/203.01 |

FOREIGN PATENT DOCUMENTS

| | | | |
|---|---|---|---|
| CN | 103796907 A | 5/2014 | |
| CN | 108569342 A | 9/2018 | |
| DE | 198 57 565 A1 | 6/2000 | |
| JP | 2003341547 A * | 12/2003 | |
| JP | 2004-306884 A | 11/2004 | |
| JP | 2015-150986 A | 8/2015 | |
| JP | 2016-83694 A | 5/2016 | |
| JP | 2018-149828 A | 9/2018 | |
| KR | 20180103691 A * | 9/2018 | ............ B62D 25/06 |
| WO | WO-2013038466 A1 * | 3/2013 | ............ B62D 25/02 |
| WO | WO-2017033626 A1 * | 3/2017 | ............ B23K 9/232 |

OTHER PUBLICATIONS

Japanese Office Action received in corresponding Japanese application No. 2022-058401 dated Sep. 30, 2025 with English translation (7 pages).

\* cited by examiner

VEHICLE BODY UPPER STRUCTURE AND ASSEMBLY METHOD OF AUTOMOBILE VEHICLE BODY

CROSS-REFERENCE TO RELATED APPLICATION

The present application claims the benefit of priority to Japanese Patent Application No. 2022-058401 filed on Mar. 31, 2022, the disclosures of all of which are hereby incorporated by reference in their entireties.

BACKGROUND OF THE INVENTION

Field of the Invention

The present invention relates to a vehicle body upper structure of an automobile and an assembly method of an automobile vehicle body.

Description of the Related Art

In recent years, research and development relating to weight reduction that contributes to an increase in energy efficiency are conducted to allow more people to secure access to affordable, reliable, sustainable, advanced energy.

In an automobile, vehicle body members made of aluminum or a light alloy such as an aluminum alloy (hereinafter, referred to as "aluminum" as appropriate) is used to achieve weight reduction of a vehicle body (for example, see JP2018-149828A).

In a vehicle body upper structure described in JP2018-149828A, in assembly of a vehicle body upper portion, first, a rail inner and a rail outer formed of steel plates are joined to each other by spot welding to form a roof side rail. Next, an aluminum side outer panel is mechanically joined to the roof side rail made of the steel plates, with non-penetrating rivets, at two locations of an upper end portion and a lower end portion on an outer side in the vehicle width direction of the roof side rail. Then, an aluminum roof panel is joined to the joined aluminum side outer panel by laser welding.

SUMMARY OF THE INVENTION

In the vehicle body upper structure described in JP2018-149828A, flange portions at two upper and lower locations of the side outer panel are joined respectively to flange portions at two upper and lower locations of the roof side rail. Accordingly, this structure has a problem of many joining locations and many joining steps.

The present invention has been thus made to solve the aforementioned problem, and an object is to provide a vehicle body upper structure and an assembly method of an automobile vehicle body that can reduce joining locations and joining steps.

Solution to Problem

To solve the aforementioned problem, a vehicle body upper structure according to the present invention includes: roof side rails provided at end portions in a vehicle width direction of a vehicle body upper portion; side outer panels covering vehicle outer side surfaces of the roof side rails; and a roof panel made of a material different from a martial of the roof side rails and provided at a center portion in a vehicle width direction of the vehicle body upper portion, the roof panel and the paired left and right side outer panels are fixed to one another by braze joining, and, in the side outer panels, outer end portions in a vehicle width direction of the side outer panels are joined to outer end portions in the vehicle width direction of the roof side rails, and inner end portions in the vehicle width direction of the side outer panels are not joined to inner end portions in the vehicle width direction of the roof side rails.

Moreover, an assembly method of an automobile vehicle body according to the present invention includes: a frame joining step of joining a floor assembly forming a floor portion of a vehicle body, side frame assemblies forming side portions of the vehicle body, and a roof arch forming an upper portion of the vehicle body to one another to form a frame member of the vehicle body; a skin joining step of braze-joining side outer panels to be arranged on outer sides in the vehicle width direction of the side frame assemblies and a roof panel to be arranged above the roof arch to one another to form a skin member of the vehicle body; and a vehicle body joining step of joining the skin member to the frame member to form the vehicle body, the skin member is made of a different material from a material of the frame member, the side frame assemblies include roof side rails provided in end portions in the vehicle width direction of a vehicle body upper portion, and, in the vehicle body joining step, outer end portions in the vehicle width direction of the side outer panels of the skin member are joined to outer end portions in the vehicle width direction of the roof side rails, and inner end portions in the vehicle width direction of the side outer panels are not joined to inner end portions in the vehicle width direction of the roof side rails.

According to the present invention, it is possible to provide a vehicle body upper structure and an assembly method of an automobile vehicle body that can reduce joining locations and joining steps.

DETAILED DESCRIPTION OF THE EMBODIMENTS

Examples of a vehicle body upper structure 1 and an assembly method of an automobile vehicle body according to an embodiment of the present invention are described with reference to FIGS. 1A to 4.

Note that the same components are denoted by the same reference numerals, and overlapping description is omitted. Moreover, in the embodiment of the present embodiment, "front" is the side toward which a vehicle C moves forward, "rear" is the side toward which the vehicle C moves backward, "up" is the vertical upper side, and "down" is the vertical lower side.

<<Vehicle>>

First, the vehicle C to which the present invention is applied is described with reference to FIG. 3, before description of the vehicle body upper structure 1 and the assembly method of an automobile vehicle body according to the embodiment of the present invention.

The vehicle C includes roof side rails 2 provided at end portions in vehicle width direction of a vehicle body upper portion 10a, side outer panels 3 covering vehicle outer side surfaces 10b of the roof side rails 2, and a roof panel 4 provided at a center portion in the vehicle width direction of the vehicle body upper portion 10a. The type, shape, and the like of the vehicle C are not limited to particular type, shape, and the like. The vehicle C may be a passenger car, a bus, a truck, a service vehicle, or the like as long as a vehicle body 10 includes the roof side rails 2, the side outer panels 3, and the roof panel 4. Description is given below by using a passage car as an example of the vehicle C.

<<Vehicle Body Upper Structure>>

The vehicle body upper structure 1 is configured to include the roof side rails 2, the side outer panels 3, and the roof panel 4.

<<Vehicle Body>>

Figure 3:
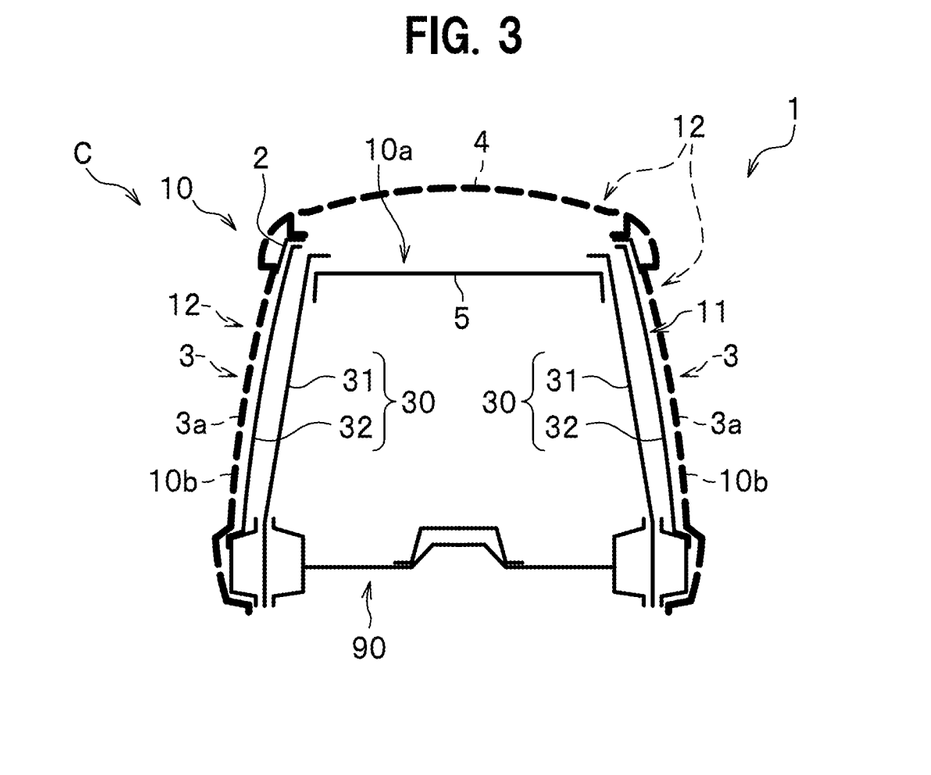
FIG. 3 is a schematic vertical cross-sectional diagram showing a state of the vehicle body after the vehicle body joining step of joining the skin member to the frame member.

As shown in FIG. 3, the vehicle body 10 is a member for forming the entire vehicle C. The vehicle body 10 is configured to include, for example, a frame member 11 formed of metal vehicle body frames such as the roof side rails 2 to be described later and a skin member 12 formed of metal vehicle body panels such as the side outer panels 3 and the roof panel 4.

In the vehicle body upper portion 10a, there are provided the roof panel 4 forming a plate portion of a roof, roof arches 5 installed below the roof panel 4 and forming a frame of a roof portion, the roof side rails 2 installed at both ends in the vehicle width direction of the roof arches 5, and the side outer panels 3 installed outside the roof side rails 2.

A door opening portion for a front seat and a door opening portion for a rear seat that are not shown are formed on each of the left and right sides of the vehicle body 10. Moreover, a front pillar, a center pillar, and a rear pillar that are not shown are provided on each of the left and right sides of the vehicle body 10. A side inner 31 and a side outer stiff 32 that forma side frame assembly 30 such as the not-shown front pillar and the rear pillar and a side panel portion 3c covering the side frame assembly 30 are arranged on each of the left and right sides of the vehicle body 10.

Note that, since the vehicle body 10 is formed to be substantially left-right symmetric, one of the passenger seat side (left side) and the driver seat side (right side) is mainly described, and the description of the other side is omitted as appropriate.

<<Roof Panel>>

Figure 1A:
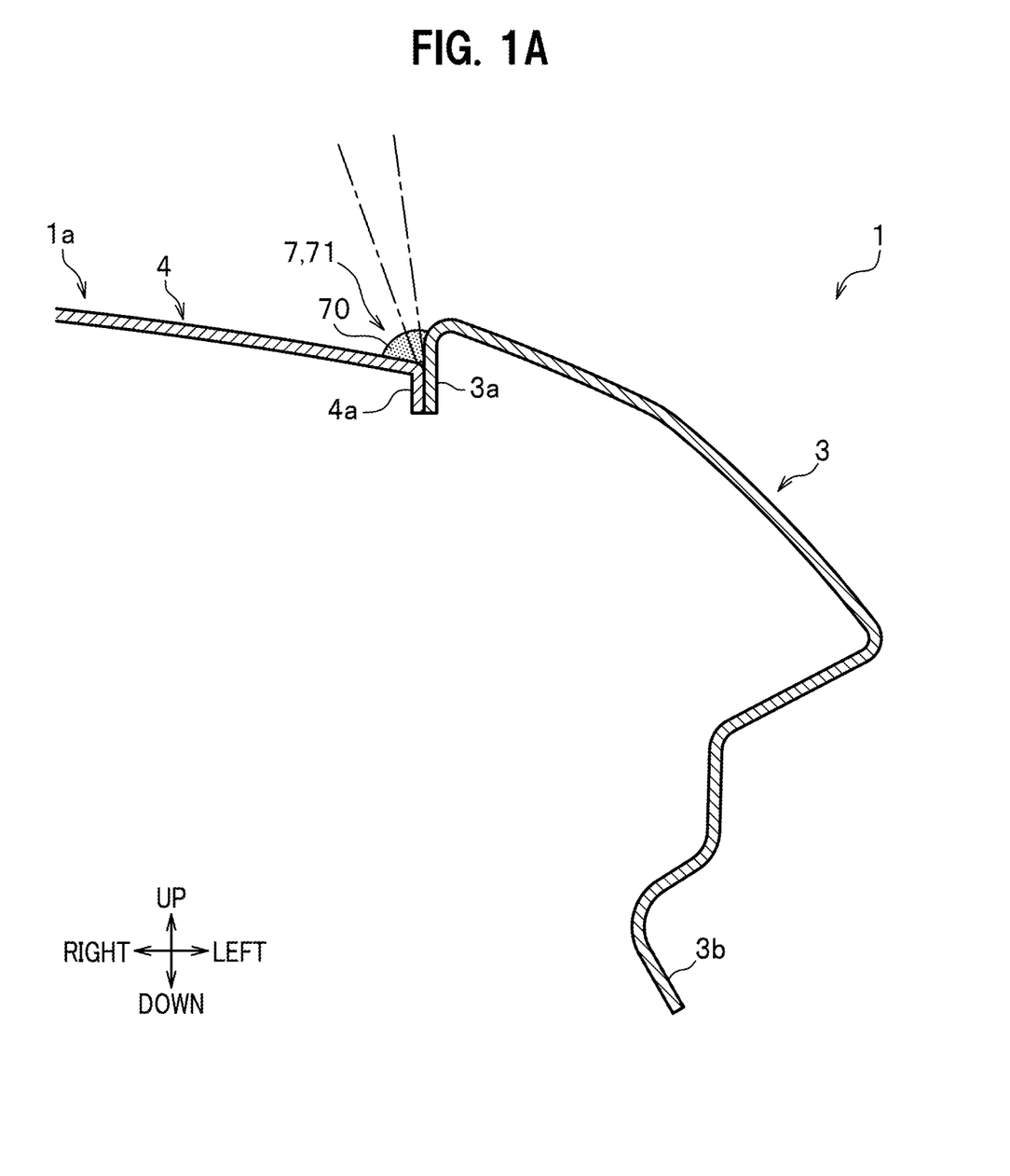
FIG. 1A is a diagram showing examples of a vehicle body upper structure and an assembly method of an automobile vehicle body according to an embodiment of the present invention, and is a schematic vertical cross-sectional diagram of a main portion showing a state where a side outer panel and a roof panel are braze-joined to each other.
Figure 2:
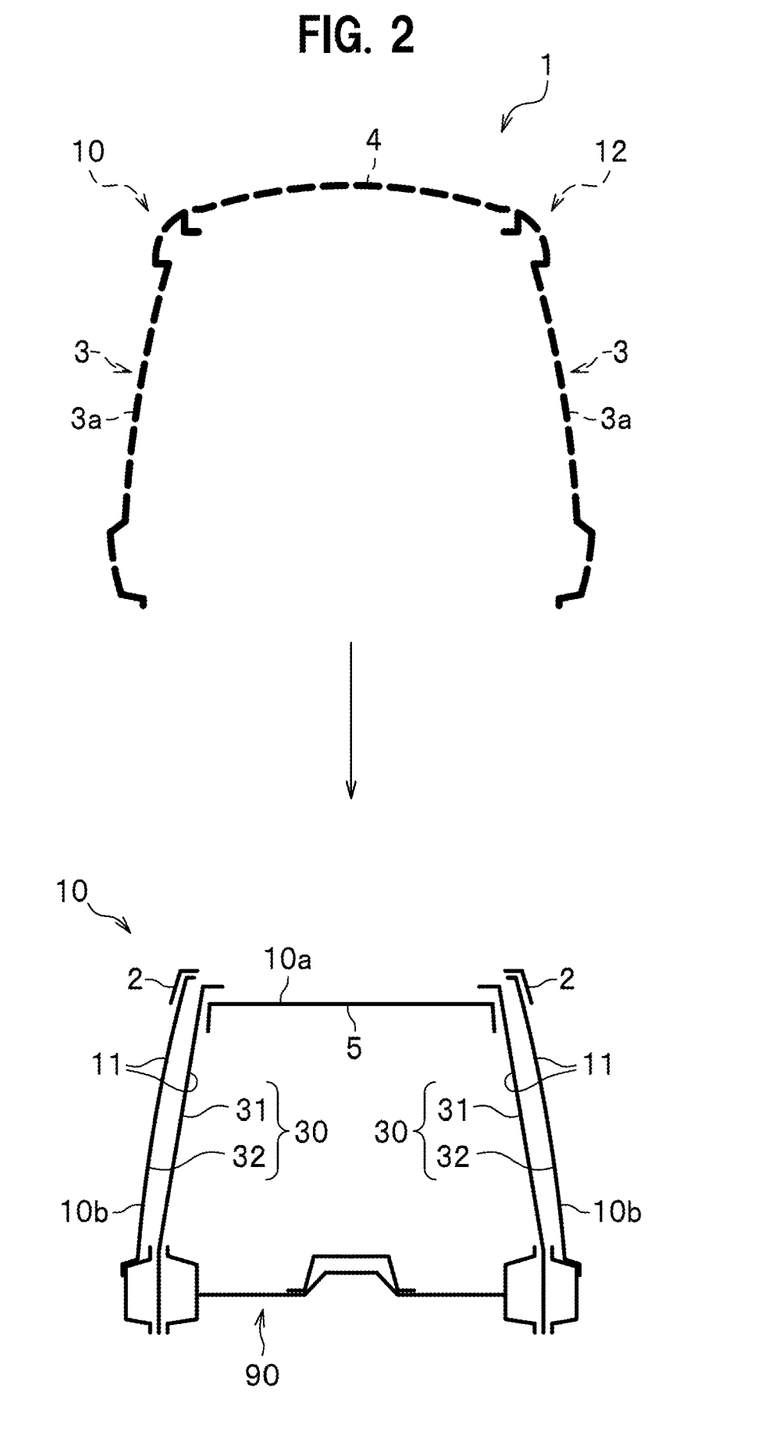
FIG. 2 is a schematic vertical cross-sectional diagram showing a vehicle body joining step of joining a skin member to a frame member.

The roof panel 4 shown in FIGS. 2 and 3 is formed of a plate of a light metal such as aluminum formed in a substantially rectangular shape in a plan view. As described above, the roof panel 4 is made of a material different from the material of the steel roof side rails 2. The roof panel 4 is provided between the left and right side outer panels 3 in the vehicle body upper portion 10a. As shown in FIG. 1A, a bent portion 4a (braze joining portion 7) is formed in each of left and right end portions of the roof panel 4.

<Bent Portion>

The bent portion 4a is a portion for forming the braze joining portion 7 that is blaze-joined to an upper end portion of the side outer panel 3 with a brazing material 70 to be connected and fixed thereto. The bent portion 4a is formed by perpendicularly bending the end portion in the vehicle width direction of the roof panel 4 downward. An outer end portion of the bent portion 4a in the vehicle width direction is braze-joined to a side outer upper flap portion 3a while being brought into contact therewith. A lower end of the bent portion 4a is arranged to be separated from an upper surface of a rail outer upper flap portion 22a of a rail outer 22.

<<Braze Joining Portion>>

Figure 1B:
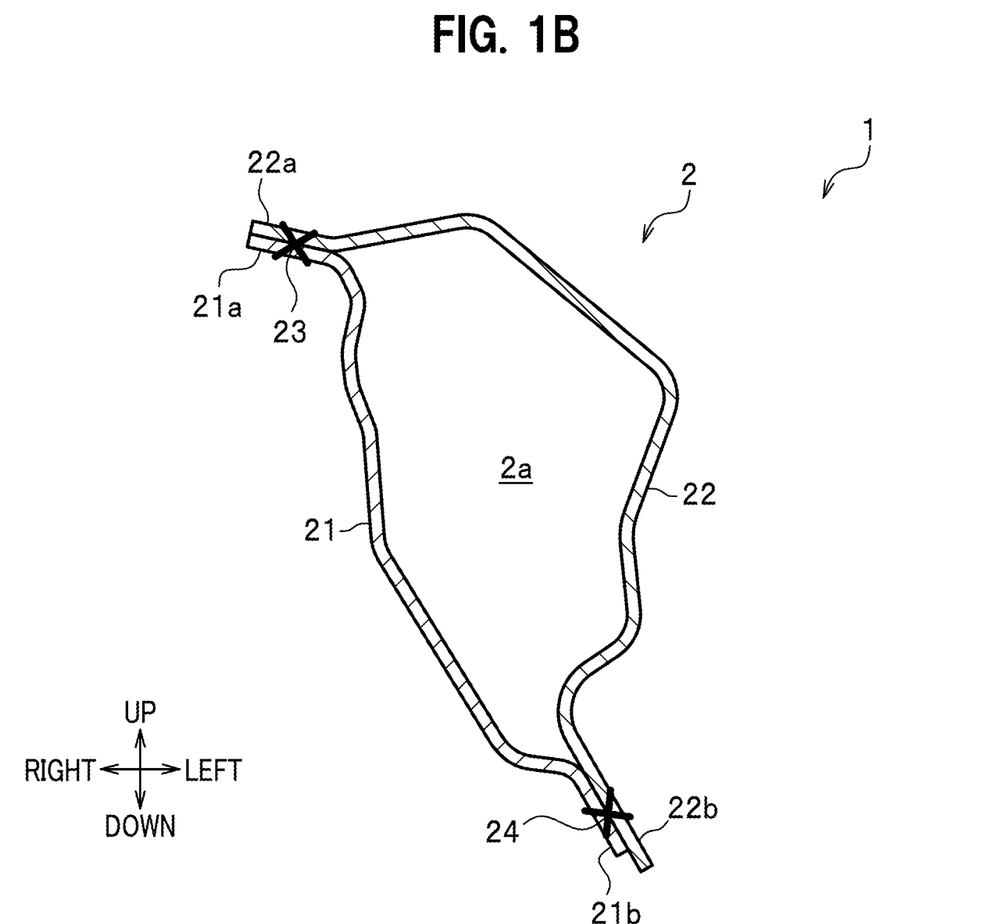
FIG. 1B is a schematic vertical cross-sectional diagram of the main portion showing a state where a rail inner and a rail outer are joined to each other.
Figure 1C:
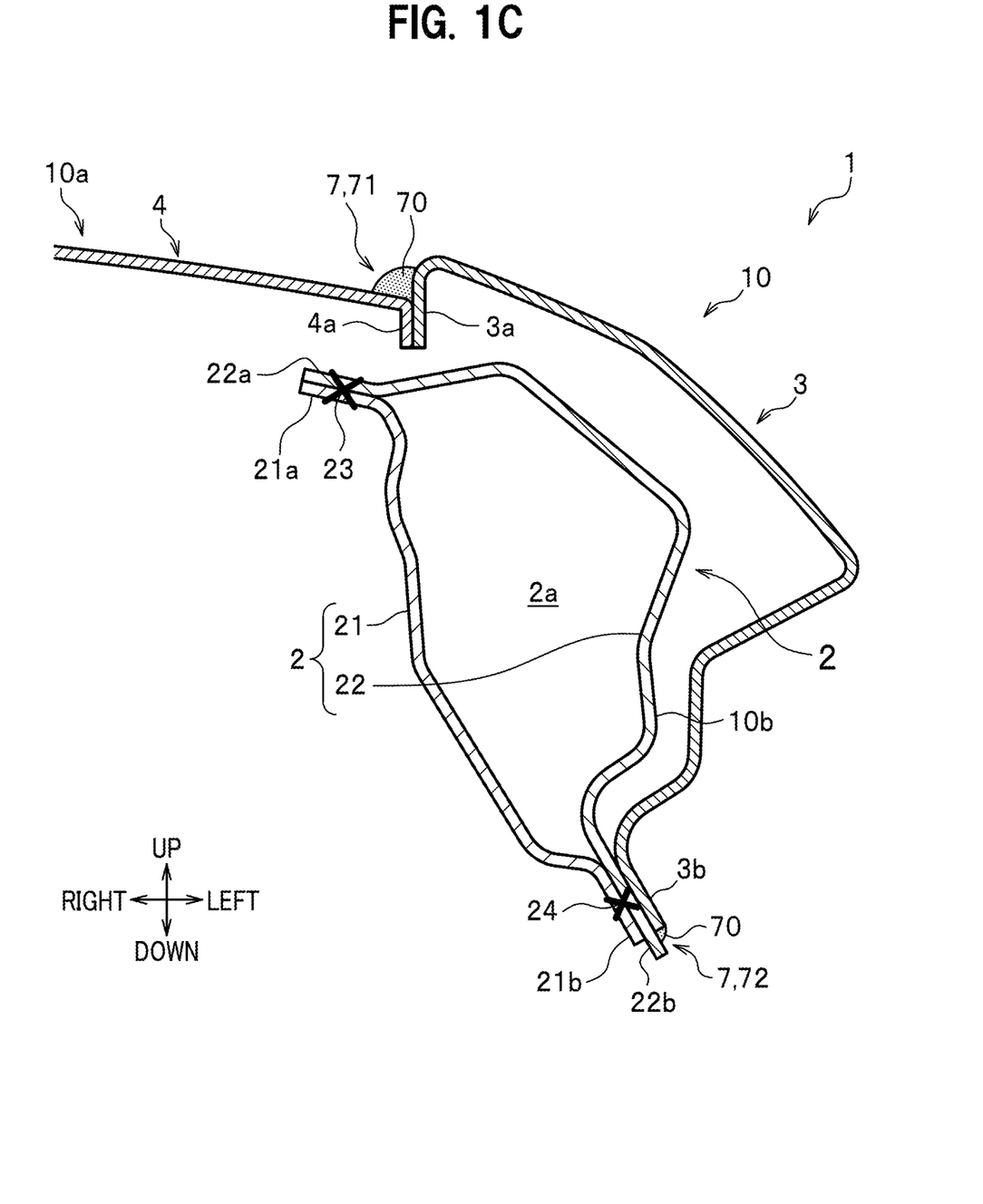
FIG. 1C is a schematic vertical cross-sectional diagram of the main portion showing a state where a roof side rail and the side outer panel to which the roof panel is joined are joined to each other.

As shown in FIG. 1C, the braze joining portion 7 is a portion where joining is performed by braze joining (also referred to as "brazing welding"). The braze joining portion 7 includes two portions of a first braze joining portion 71 and a second braze joining portion 72. An aluminum alloy is used as the brazing material 70 used in the braze joining in the braze joining portion 7.

The first braze joining portion 71 joins an upper end portion of the side outer upper flap portion 3a of the aluminum side outer panel 3 and the bent portion 4a of the aluminum roof panel 4 to each other. The first braze joining portion 71 is continuously provided to extend from a front end portion to a rear end portion of the outer end portion in the vehicle width direction of the roof panel 4.

The second braze joining portion 72 joins a lower end portion of a side outer lower flap portion 3b of the aluminum side outer panel 3 and a rail outer lower flap portion 22b of the steel roof side rail 2 to each other. The second braze joining portion 72 is continuously provided to extend from a front end portion to a rear end portion of an outer lower end portion in the vehicle width direction of the side outer panel 3. The braze joining portion 7 is thus provided between an outer end portion (lower end portion) in the vehicle width direction of the side outer panel 3 and an outer end portion (lower end portion) in the vehicle width direction of the roof side rail 2. An inner end portion (upper end portion) in the vehicle width direction of the side outer panel 3 is not joined to an inner end portion (upper end portion) in the vehicle width direction of the roof side rail 2.

<<Roof Arch>>

As shown in FIGS. 2 and 3, the roof arches 5 are members that support the roof panel 4 from below. The roof arches 5 are formed of multiple members laid between the left and right roof side rails 2. The roof arches 5 are arranged at appropriate intervals from a front end to a rear end of the vehicle body upper portion 10a.

<<Roof Side Rails>>

As shown in FIGS. 2 and 3, the roof side rails 2 are paired left and right tubular frame members arranged in upper side portions of the vehicle body 10 to extend in the front-rear direction (see FIG. 1B). The roof side rails 2 are installed to extend from front ends to rear ends of left and right end portions of the vehicle body upper portion 10a, and form upper edges of the door opening portions (illustration is omitted).

As shown in FIG. 1B, in each roof side rail 2, a rail inner 21 arranged on the vehicle inner side and the rail outer 22 arranged on the vehicle outer side of the rail inner 21 are joined in joining portions 23 and 24 to form a closed cross section 2a in a vertical cross-sectional view. The rail inner 21 and the rail outer 22 are made of steel (for example, high tensile strength steel plate or the like), unlike the roof panel 4 and the side outer panels 3 made of aluminum.

<Rail Inner>

As shown in FIG. 1C, the rail inner 21 is a member that holds the roof panel 4 and the roof arches 5 (see FIGS. 2 and 3). The rail inner 21 is a half body that forms a vehicle inner side portion of the roof side rail 2 formed in a tubular shape by the rail inner 21 and the rail outer 22. The rail inner 21 includes a rail inner upper flap portion 21a formed by bending an upper edge portion substantially horizontally toward the vehicle body inner side and a rail inner lower flap portion 21b formed by bending a lower end portion obliquely downward toward the vehicle body inner side.

<Rail Outer>

The rail outer 22 is a half body that forms a vehicle outer side portion of the roof side rail 2. The rail outer 22 is arranged to face the rail inner 21 with the closed cross section 2a arranged between the rail outer 22 and the rail inner 21, and is provided to extend in the front-rear direction. The rail outer 22 includes the rail outer upper flap portion 22a provided in an upper edge portion to extend in the front-rear direction and the rail outer lower flap portion 22b provided in a lower edge portion to extend in the front-rear direction.

The rail outer upper flap portion 22a is laid on top of the rail inner upper flap portion 21a and spot-welded in the joining portion 23 to be joined to the rail inner upper flap portion 21a. The rail outer lower flap portion 22b is laid on the rail inner lower flap portion 21b and spot-welded in the joining portion 24 to be joined to the rail inner lower flap portion 21b. Moreover, the side outer lower flap portion 3b is laid on the rail outer lower flap portion 22b, and the rail outer lower flap portion 22b is braze-joined in the second braze joining portion 72 with the brazing material 70 to be joined to the side outer panel 3.

<<Side Outer Panels>>

As shown in FIG. 1C, the side outer panels 3 are paired left and right panel members arranged to mainly cover the vehicle outer side surfaces 10b of the roof side rails 2 from the outer sides in the vehicle width direction. The side outer panels 3 are formed of paired left and right aluminum members extending in the front-rear direction. Each side outer panel 3 includes the side outer upper flap portion 3a, the side outer lower flap portion 3b, and a side panel portion 3c (see FIGS. 2 and 3). Although illustration is omitted, the side outer panel 3 also includes a portion covering the pillars of the frame member 11 from the outer side.

The outer end portion (lower end portion) in the vehicle width direction of the side outer panel 3 is joined to the outer end portion (lower end portion) in the vehicle width direction of the roof side rail 2 by braze joining. The inner end portion (upper end portion) in the vehicle width direction of the side outer panel 3 is not joined to the inner end portion (upper end portion) in the vehicle width direction of the roof side rail 2. Moreover, the side outer panel 3 and the roof panel 4 are fixed to each other by braze joining.

The side outer upper flap portion 3a is an upper flange portion formed in an upper edge portion of the side outer panel 3 and provided to extend in the front-rear direction. The side outer upper flap portion 3a is formed by perpendicularly bending an upper end of the side outer panel 3 downward. As described above, the side outer panel 3 and the roof panel 4 are fixed to each other by braze-joining a middle portion of the side outer upper flap portion 3a and the bent portion 4a to each other. A lower end of the side outer upper flap portion 3a is arranged to be separated from an upper portion of the rail outer 22.

The side outer lower flap portion 3b is a lower flange portion formed in a lower edge portion of the side outer panel 3 and provided to extend in the front-rear direction. The side outer lower flap portion 3b is formed by bending a lower end portion of the side outer panel 3 obliquely downward toward the outer side in the vehicle width direction along the rail outer lower flap portion 22b. As described above, the side outer panel 3 and the roof side rail 2 are fixed to each other by braze joining at one location in the side outer lower flap portion 3b and the rail outer lower flap portion 22b.

As illustrated in FIGS. 2 and 3, the side panel portion 3c covers the side frame assembly 30 from the outer side in the vehicle width direction.

<<Nibbler>>

Figure 1D:
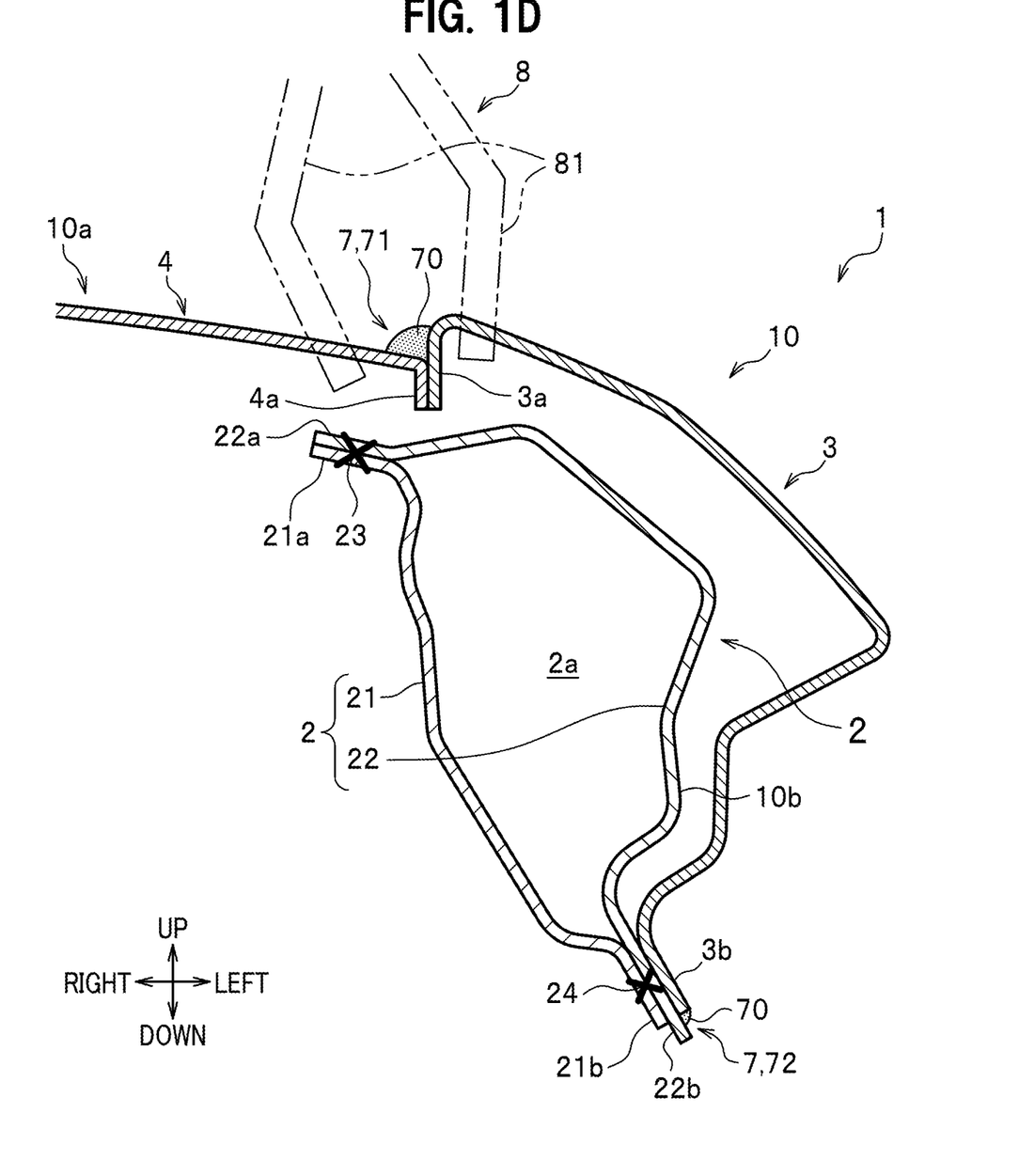
FIG. 1D is a schematic vertical cross-sectional diagram of the main portion showing a state where the roof panel is teared off from a vehicle body with a nibbler.

As shown in FIG. 1D, a nibbler 81 is a device for grabbing a metal plate or cutting a metal plate by punching. The nibbler 81 is provided in a heavy machine 8 used for dismantling of the vehicle C or the like. The vehicle body upper structure 1 allows the nibbler 81 provided in the heavy machine 8 to grab the roof panel 4 when the roof panel 4 is to be teared off from the vehicle body with the nibbler 81.

<<Effects of Vehicle Body Upper Structure and Assembly Method of Automobile Vehicle Body>>

Next, effects of the vehicle body upper structure 1 and the assembly method of an automobile vehicle body according to the embodiment of the present invention are described in the order of assembly steps with reference to FIGS. 1A to 3.

<Pressing Step>

In the assembly of the vehicle body 10, first, there is performed a pressing step of forming the side inners 31 and the side outer stiffs 32 shown in FIG. 2 by pressing.

<Side Frame Assembly Forming Step>

Next, there is performed a side frame assembly forming step of aligning the flange portions of the side inners 31 and the flange portions of the side outer stiffs 32 and joining the flange portions by laser welding or resistance welding to form the side frame assemblies 30. In each of the formed side frame assemblies 30, the side inner 31 formed of a steel plate (for example, high tensile force steel plate or the like) and the side outer stiff 32 are joined to form a closed cross section therebetween. Accordingly, the frame member 11 with high stiffness can be obtained. The roof side rails 2 are joined to upper portions of the side frame assemblies 30.

Moreover, as shown in FIG. 1B, the rail inner upper flap portion 21a of the rail inner 21 and the rail outer upper flap portion 22a of the rail outer 22 are aligned and joined by spot welding. Furthermore, the rail inner lower flap portion 21b of the rail inner 21 and the rail outer lower flap portion 22b of the rail outer 22 are aligned and joined by spot welding to form each of the roof side rails 2 forming the frame member 11.

<Frame Joining Step>

Next, a floor assembly 90 forming a vehicle body floor portion, the side frame assemblies 30 forming side portions of the vehicle body 10, the roof arches 5 forming the vehicle body upper portion 10a, and a not-shown rear frame assembly forming a vehicle body rear portion are simultaneously set. Then, there is performed a frame joining step of joining the floor assembly 90, the side frame assemblies 30, the roof arches 5, and the rear structural assembly (illustration is omitted) to one another by, for example, laser welding to form the frame member 11 of the entire vehicle body 10.

<Skin Joining Step>

Next, as shown in FIG. 1A or 2, there is performed a skin joining step of braze-joining the side outer panels 3 arranged on the outer sides in the vehicle width direction of the side frame assemblies 30 and the roof panel 4 arranged above the roof arches to one another to form the skin member 12 of the vehicle body 10.

<Vehicle Body Joining Step>

Next, as shown in FIG. 2, there is performed a vehicle body joining step of joining the skin member 12 made of aluminum that is a different material from that of the frame member 11 to the frame member 11 made of steel to form the entire vehicle body as shown in FIG. 3. As shown in FIG. 1C, 2, or 3, the side outer lower flap portions 3*b* in the outer end portions in the vehicle width direction of the side outer panels 3 in the skin member 12 are braze-joined to the rail outer lower flap portions 22*b* in the outer end portions in the vehicle width direction of the roof side rails 2. In this case, the side outer upper flap portions 3*a* in the inner end portions in the vehicle width direction of the side outer panels 3 are not joined onto the rail outer upper flap portions 22*a* in the inner end portions in the vehicle width direction of the roof side rails 2.

The vehicle body 10 is thus assembled.

<<Advantageous Effects of Vehicle Body Upper Structure and Assembly Method of Automobile Vehicle Body>>

Next, effects of the vehicle body upper structure 1 and the assembly method of an automobile vehicle body according to the embodiment of the present invention are described with reference to FIGS. 1A to 4 in comparison to a comparative example shown in FIG. 4.

Figure 4:
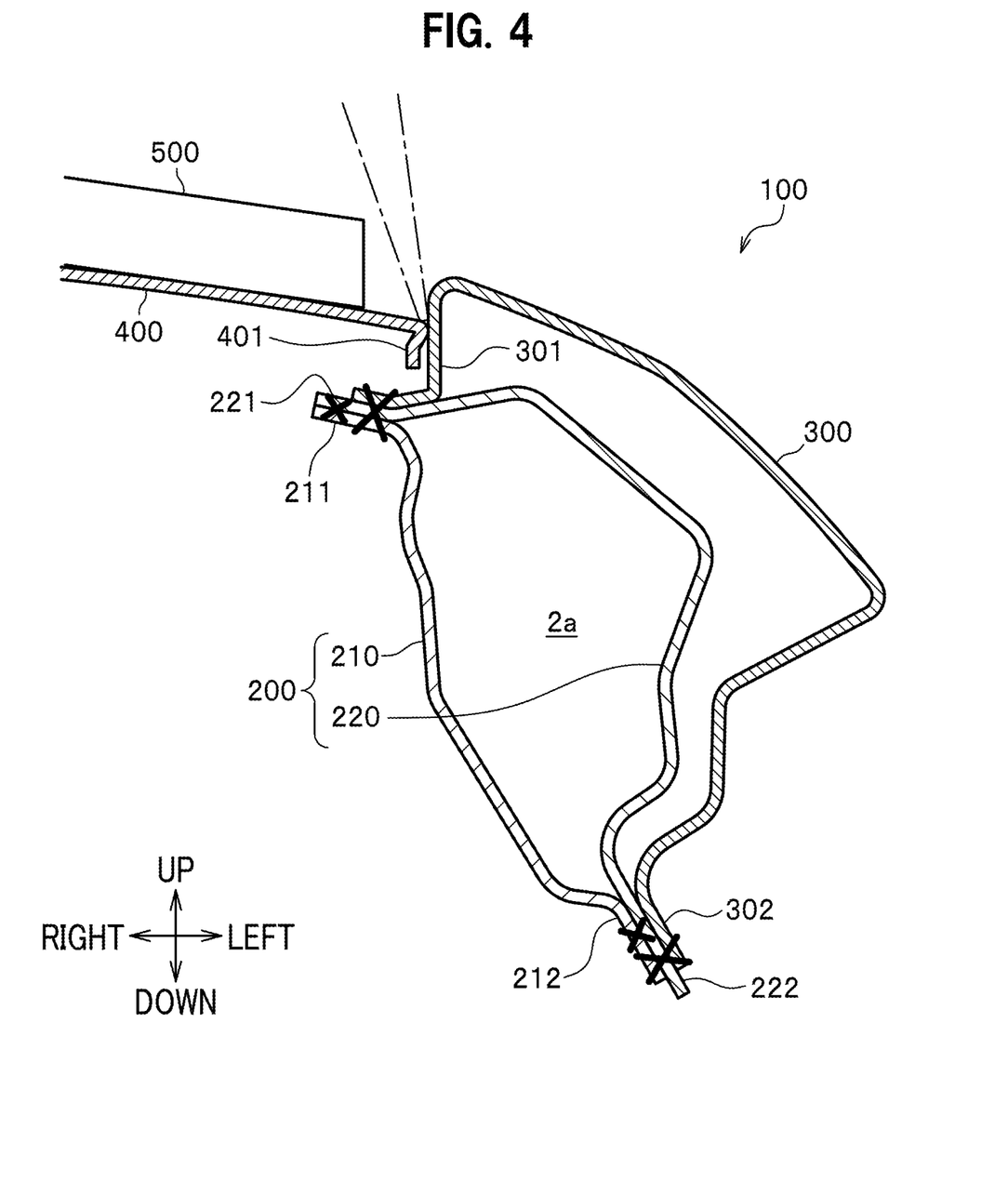
FIG. 4 is a schematic vertical cross-sectional diagram of the main portion showing a comparative example in which a roof panel, a side outer panel, and a roof side rail are joined to one another.

FIG. 4 is a schematic vertical cross-sectional diagram of a main portion showing the comparative example in which a roof panel 400, a side outer panel 300, and a roof side rail 200 are joined.

In a normal automobile, when the vehicle body upper portion 10*a* is assembled, as in a vehicle body upper structure 100 of the comparative example shown in FIG. 4, first, a rail inner upper flap portion 211 of a steel rail inner 210 and a rail outer upper flap portion 221 of a steel rail outer 220 are spot-welded. Moreover, a rail inner lower flap portion 212 of the rail inner 210 and a rail outer lower flap portion 222 of the rail outer 220 are spot-welded to form the roof side rail 200.

Next, a side outer upper flap portion 301 of the side outer panel 300 is joined to the rail outer upper flap portion 221 of the roof side rail 200, and a side outer lower flap portion 302 is joined to the rail outer lower flap portion 222. As described above, in the vehicle body upper structure 100 of the comparative example, in the attachment of the side outer panel 300 to the roof side rail 200, the joining is performed at two locations. Accordingly, the comparative example has many joining locations and many joining steps. Thus, variation in manufacturing is more likely to occur in the vehicle body upper structure 100 of the comparative example.

Meanwhile, in the vehicle body upper structure 1 of the present invention, as shown in FIG. 1C, in the joining of the side outer panel 3 to the roof side rail 2, only the side outer lower flap portion 3*b* and the rail outer lower flap portion 22*b* are joined to each other in the second braze joining portion 72. Accordingly, the present invention has few joining locations and few joining steps. Thus, variation in manufacturing can be suppressed.

Accordingly, the vehicle body upper structure 1 of the present invention can reduce assembly steps and assembly time in the assembly of the vehicle body 10 and reduce dismantling steps and dismantling time in the dismantling to achieve cost reduction.

Moreover, in the vehicle body upper structure 100 of the comparative example shown in FIG. 4, in the joining of the roof panel 400 to the side outer panel 300, the roof panel 400 needs to be pressed from above with a jig 500 to close a gap between the roof panel 400 and the side outer panel 300. This is due to the following reason. Since the side outer panel 300 is joined to the roof side rail 200 in advance, variation in manufacturing between the left and right side outer panels 300 causes a gap to form between the roof panel 400 and each side outer panel 300. Accordingly, in the vehicle body upper structure 100 of the comparative example, the roof panel 400 is pressed from above with the jig 500 to maintain a state where the side outer upper flap portion 301 of the side outer panel 300 is in contact with the roof panel 400, and a bent portion 401 is joined by laser welding.

Moreover, since the side outer panel 300 is joined to the roof side rail 200 in advance, a jig cannot be provided below the roof panel 400 (portion where the rail inner upper flap portion 211 and the rail outer upper flap portion 221 are arranged). Accordingly, positioning of the roof panel 400 at an accurate position is difficult.

Due to above reasons, in the vehicle body upper structure 100 of the comparative example, in the joining of the roof panel 400 to the side outer panel 300, the jig 500 needs to be used to prevent formation of a gap between the roof panel 400 and the side outer panel 300, and the roof panel 400 is positioned at the accurate position. Accordingly, work is cumbersome.

Meanwhile, in the vehicle body upper structure 1 of the present invention, as shown in FIGS. 1A and 2, the roof panel 4 and the side outer panels 3 are joined to one another to form the skin member 12, before joining to the roof side rails 2.

Accordingly, the skin member 12 formed of the roof panel 4 and the left and right side outer panels 3 can be braze-welded in a state where the roof panel 4 and the left and right side outer panels 3 can be freely positioned. Thus, it is possible to simplify the jig and perform joining at the accurate position.

As described above, the aluminum roof panel 4 is joined to the aluminum side outer panels 3 with the aluminum brazing material 70, and is not joined to the steel roof side rails 2. Accordingly, when the roof panel 4 is dismantled from the vehicle body upper portion 10*a* by grabbing the outer end portion in the vehicle width direction of the roof panel 4 with the nibbler 81 shown in FIG. 1D, the aluminum roof panel 4 or the aluminum side outer panels 3 can be separated such that no iron parts such as the roof side rail 2 is included.

Moreover, when the roof panel 4 is separated before the side outer panels 3, since the side outer upper flap portions 3*a* in the upper end portions of the side outer panels 3 are not joined to the roof side rails 2, the upper end portions of the side outer panels 3 can be easily grabbed in the dismantling with the nibbler 81. Thus, the vehicle body upper structure 1 of the present invention has a structure that facilitates work of separating the vehicle body 10 with the nibbler 81.

As described above, as illustrated in FIG. 1C, 2, or 3, the vehicle body upper structure 1 according to the present invention includes the roof side rails 2 provided in the end portions in the vehicle width direction of the vehicle body upper portion 10*a*, the side outer panels 3 covering the vehicle outer side surfaces 10*b* of the roof side rails 2, and the roof panel 4 made of the material different from the martial of the roof side rails 2 and provided at the center portion in the vehicle width direction of the vehicle body upper portion 10*a*, the roof panel 4 and the paired left and right side outer panels 3 are fixed to one another by braze joining, and, in the side outer panels 3, the outer end portions in the vehicle width direction of the side outer panels 3 are joined to the vehicle width direction outer end portions of the roof side rails 2, and the inner end portions in the vehicle width direction of the side outer panels 3 are not joined to the inner end portions in the vehicle width direction of the roof side rails 2.

According to such a configuration, in the vehicle body upper structure 1 of the present invention, the outer end portions in the vehicle width direction of the side outer panels 3 are joined to the outer end portions in the vehicle width direction of the roof side rails 2, and the inner end portions in the vehicle width direction of the side outer panels 3 are not joined to the inner end portions in the vehicle width direction of the roof side rails 2. Accordingly, the present invention has few joining locations in which the side outer panels 3 and the roof side rails 2 are joined, and has few joining steps.

Thus, the present invention can reduce the assembly steps and the assembly time in the assembly of the vehicle body 10 and reduce the dismantling steps and the dismantling time in the dismantling to achieve cost reduction.

Moreover, as shown in FIG. 1C, the side outer panels 3 and the roof panel 4 are made of aluminum, the roof side rails 2 are made of steel, and the brazing material 70 used in the braze joining of the side outer panels 3 and the roof panel 4 is made of the aluminum alloy.

In such a configuration, the roof side rails 2 and the set of the side outer panels 3 and the roof panel 4 are joined by braze joining using the aluminum alloy brazing material 70. Accordingly, the aluminum side outer panels 3 and roof panel 4 and the steel roof side rails 2 can be firmly joined to one another with the aluminum alloy brazing material 70, even though these parts are made of different materials.

Moreover, as shown in FIG. 1D, when the aluminum side outer panels 3 and roof panel 4 are teared off from the steel roof side rails 2 with the nibbler 81 or the like, since the side outer panels 3 and the roof panel 4 are joined with the aluminum brazing material 70, no steel material is mixed. Accordingly, it is possible to take out high-purity aluminum in which no iron or the like is mixed, by removing only the aluminum parts before cutting of the side outer panels 3 and the roof panel 4.

Furthermore, since the side outer panels 3 and the roof panel 4 are joined with the aluminum brazing material 70, joining strength is lower than that in a portion where steel members are welded. Accordingly, parts can be easily separated from the portion where the parts are joined with the aluminum brazing material 70.

Moreover, as shown in FIG. 1C, 2, or 3, the assembly method of an automobile vehicle body according to the present invention includes the frame joining step of joining the floor assembly 90 forming the floor portion of the vehicle body 10, the side frame assemblies 30 forming the side portions of the vehicle body 10, and the roof arches 5 forming the upper portion of the vehicle body 10 to one another to form the frame member 11 of the vehicle body 10, the skin joining step of braze-joining the side outer panels 3 to be arranged on the outer sides in the vehicle width direction of the side frame assemblies 30 and the roof panel 4 to be arranged above the roof arches 5 to form the skin member 12 of the vehicle body 10, and the vehicle body joining step of joining the skin member 12 to the frame member 11 to form the vehicle body 10, the skin member 12 is made of a different material from that of the frame member 11, the side frame assemblies 30 include the roof side rails 2 provided at the end portions in the vehicle width direction of the vehicle body upper portion 10a, and, in the vehicle body joining step, the outer end portions in the vehicle width direction of the side outer panels 3 of the skin member 12 are joined to the outer end portions (lower end portions) in the vehicle width direction of the roof side rails 2 and the inner end portions in the vehicle width direction of the side outer panels 3 are not joined to the inner end portions (upper end portions) in the vehicle width direction of the roof side rails 2.

According to such a configuration, the outer end portions in the vehicle width direction of the side outer panels 3 are joined to the outer end portions in the vehicle width direction of the roof side rails 2, and the inner end portions in the vehicle width direction of the side outer panels 3 are not joined to the inner end portions in the vehicle width direction of the roof side rails 2. Thus, the present invention has few joining locations, and can reduce the joining steps and the joining time to achieve cost reduction and can also suppress variation in manufacturing.

Note that the present invention is not limited to the aforementioned embodiment. Various modifications and changes can be made within the scope of the technical idea of the present invention, and the present invention encompasses these modified and changed inventions as a matter of course.

What is claimed is:

1. A vehicle body upper structure comprising:
   roof side rails provided at end portions in a vehicle width direction of a vehicle body upper portion;
   side outer panels covering vehicle outer side surfaces of the roof side rails; and
   a roof panel made of a material different from a martial of the roof side rails and provided at a center portion in the vehicle width direction of the vehicle body upper portion, wherein
   the roof panel and the paired left and right side outer panels are fixed to one another by braze joining, and
   in the side outer panels
      outer end portions in the vehicle width direction of the side outer panels are joined to outer end portions in the vehicle width direction of the roof side rails, and
      inner end portions in the vehicle width direction of the side outer panels are not joined to inner end portions in the vehicle width direction of the roof side rails.

2. The vehicle body upper structure according to claim 1, wherein
   the side outer panels and the roof panel are made of aluminum,
   the roof side rails are made of steel, and
   a brazing material used in the braze joining of the side outer panels and the roof panel is made of an aluminum alloy.

3. An assembly method of an automobile vehicle body comprising steps of:
   joining a floor assembly forming a floor portion of a vehicle body, side frame assemblies forming side portions of the vehicle body, and a roof arch forming an upper portion of the vehicle body to one another to form a frame member of the vehicle body;
   skin joining braze-joining side outer panels to be arranged on outer sides in the vehicle width direction of the side frame assemblies and a roof panel to be arranged above the roof arch to one another to form a skin member of the vehicle body; and
   vehicle body joining of joining the skin member to the frame member to form the vehicle body, wherein
   the skin member is made of a different material from a material of the frame member, the side frame assemblies include roof side rails provided at end portions in the vehicle width direction of a vehicle body upper portion, and in the vehicle body joining, outer end portions in the vehicle width direction of the side outer panels of the skin member are joined to outer end portions in the vehicle width direction of the roof side rails, and inner end portions in the vehicle width direction of the side outer panels are not joined to inner end portions in the vehicle width direction of the roof side rails.

* * * * *